United States Patent
Tseng et al.

(10) Patent No.: US 7,805,601 B2
(45) Date of Patent: Sep. 28, 2010

(54) COMPUTERIZED APPARATUS AND METHOD FOR VERSION CONTROL AND MANAGEMENT

(75) Inventors: Yaudeh Tseng, Pingtung (TW); Shin-Yan Chiou, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 623 days.

(21) Appl. No.: 11/781,943

(22) Filed: Jul. 23, 2007

(65) Prior Publication Data

US 2008/0189542 A1 Aug. 7, 2008

(30) Foreign Application Priority Data

Feb. 2, 2007 (TW) .............................. 96103863 A

(51) Int. Cl.
*G06F 9/24* (2006.01)
(52) U.S. Cl. ................................ 713/2; 713/1; 713/175
(58) Field of Classification Search .................... 713/1, 713/2, 100, 156, 168, 175
See application file for complete search history.

(56) References Cited

U.S. PATENT DOCUMENTS

| 6,327,652 | B1 | 12/2001 | England et al. ............... 713/2 |
|---|---|---|---|
| 6,330,670 | B1 | 12/2001 | England et al. ............... 713/2 |
| 6,697,944 | B1 | 2/2004 | Jones et al. ................. 713/168 |
| 6,801,999 | B1 | 10/2004 | Venkatesan et al. ......... 713/167 |
| 6,820,063 | B1 | 11/2004 | England et al. ............... 705/54 |
| 6,850,252 | B1 | 2/2005 | Hoffberg ..................... 345/716 |
| 6,898,706 | B1 | 5/2005 | Venkatesan et al. ......... 713/167 |
| 6,988,204 | B2 | 1/2006 | Alve et al. ................... 713/193 |
| 7,065,649 | B2 * | 6/2006 | Carbone et al. ............. 713/176 |
| 7,100,047 | B2 | 8/2006 | Stamos et al. ............... 713/165 |
| 2004/0193873 | A1 * | 9/2004 | England ....................... 713/156 |
| 2005/0060549 | A1 * | 3/2005 | England et al. ............. 713/175 |
| 2005/0132229 | A1 * | 6/2005 | Zhang et al. ................ 713/201 |
| 2006/0036851 | A1 * | 2/2006 | DeTreville .................. 713/159 |
| 2006/0083369 | A1 | 4/2006 | Lee | |

OTHER PUBLICATIONS

William A. Arbaugh, David J. Farber, and Jonathan M. Smith. "A Secure and Reliable Bootstrap Architecture", In Proceedings 1997 IEEE Symposium on Security and Privacy, pp. 65-71, May 1997.

* cited by examiner

*Primary Examiner*—Dennis M Butler

(57) ABSTRACT

Disclosed is a computerized apparatus and method for version control and management. The apparatus includes a cryptography boot loader, a control module on key usage, and one or more agents. After the user's device is powered on, the cryptography boot loader stores a user key, and checks an operating system (OS) certificate for an OS and an application certificate for an application to determine whether these certificates are valid. Then, a right object is obtained with a user certificate through an agent. The control module on key usage compares the OS version and the application version with the version required by the right object. The permission access to the user key is determined by the comparison result. This invention associates the cryptography component with the boot loader to develop a security mechanism performed by OS and application for using a secret key.

18 Claims, 8 Drawing Sheets

COMPUTERIZED APPARATUS AND METHOD FOR VERSION CONTROL AND MANAGEMENT

FIELD OF THE INVENTION

The present invention generally relates to a computerized apparatus and method for version control and management.

BACKGROUND OF THE INVENTION

The information technology (IT) development allows the digitalization of many daily and business practices. Much information, such as documents, images, video, music and animations, is stored in PC, digital media or mobile devices. Internet enables further sharing of the digital information across borders and time restrictions. As a large amount of digital contents are created and shared, more and more digital contents are stolen and the privacy is violated. The security problem poses a real threat to the wider application of IT. The concept of digital right management (DRM) is a result of the need to regulate the authorization and sharing of information in order to provide protection over the information and related privacy issues.

A DRM technology championed by Open Mobile Alliance (OMA), called OMA DRM, can provide the protection and delivery management of the wireless digital contents. OMA DRM regulation ensures the use of digital contents on mobile devices, such as cell phones, and follows the usage right of the object to protect the intellectual property (IP) right of high value digital contents. In other words, the use of OMA DRM allows the digital content providers to exercise the rights in accordance with the digital contents, for example, free examination of DRM content in advance, legitimate delivery of the DRM content according to the access rights, and new business model supporting DRM content.

In other words, OMA DRM allows the digital content providers to use with the access rights configuration to perform content storage, protection and management so that the DRM mechanism can be added to the hand-held mobile devices, such as in Java, MMS, browser, and Email software as to provide content protection capability.

Basically, it is important to allow both digital content providers and mobile device users to control the perspective responsibilities in terms of the use of the downloaded media objects. The object downloading is the important means for the media object delivery between mobile devices, and DRM is the important mechanism for controlling the use of media objects when downloading. DRM allows the digital content providers to define access rights of the use of the media objects, and establish the relation between an individual media object and different access rights. Furthermore, different pricing policies can be defined based on different access rights.

Therefore, the digital content providers can provide users with the rights to free preview of media objects, and charge for different use of the objects. As the object price is determined by the use instead of the object itself, DRM can sell the rights to use instead of the media object itself, which makes more practical sense for media use as well as effective management of DRM.

In the OMA DRM architecture, it relies on the DRM agent for controlling the right object (RO) rights. However, how the DRM agent controls the RO rights is not defined. Therefore, when a DRM agent checks the RO or executes the content object (CO), the conventional technique may face the following threats, for example, as disclosed in the following documents.

William et. al. disclosed a bootstrap architecture, as shown in FIG. 1. The bootstrap architecture uses an Aegis ROM 101 to download an operating system 105 from a trusted network recovery host 103. The bootstrap architecture is for secure OS, mainly to prevent the illegitimate users while neither addressing the issue of attack from the legitimate users nor the key usage mechanism. If the user removes the Aegis ROM and rewrites the hacking program, the system will be compromised. For example, an assembly language can be used to rewrite the program to skip the serial number checking or the access right checking block.

U.S. Pat. No. 6,850,252 disclosed an intelligent electronic appliance system and method. The method to achieve DRM is to allow the intelligent electronic appliance to check the hardware before downloading, and the music or video provided by a server is to be distorted for that hardware. Therefore, the music or the video can only be played on that hardware. However, if the user uses assembly language or similar method to rewrite the program, this DRM can be bypassed.

U.S. Pat. No. 6,820,063 disclosed a method for controlling access to content based on certificates and access predicates, by using the association relation between the CPU of the computer system and the operation system to ensure that computerized method will not be replaced. This method checks the correctness of access predicate, OS certificates, and rights manager certificate to control the content access. This particular association is neither described nor regulated. How to upgrade or process when a bug exists in the OS is neither described nor regulated. The user may use the error in the OS to write a different program to access the CO of the executing DRM agent, or use the error in the OS to execute a memory dump to access the CO stored in the memory.

U.S. Pat. Nos. 6,330,670 and 6,327,652 disclosed a DRM OS and a load and identify DRM OS, respectively. Both documents presented the establishment of trusted identity, whose technique is to hash the OS and store the hashed OS in the CPU.

This type of trusted platform module (TPM) does not perform RSA encryption and identification; therefore, it cannot perform DRM rights protection stand-alone.

In addition to the above threats, the conventional techniques do not provide any solution when there is error in the DRM agent or in the OS.

SUMMARY OF THE INVENTION

In an exemplary embodiment, the present disclosure may provide a computerized apparatus and method for version control and management. The present invention is applicable to the DRM of digital contents. For key access management and version upgrade application, the present invention can effectively prevent the key from malicious access by either programs or users.

In an exemplary embodiment, the present disclosure may provide DRM in a secured OS and application environment. The present invention uses cryptography component and boot loader to ensure only secured OS and secured application can access the secret key of the cryptography component.

The computerized apparatus in an exemplary embodiment of the present disclosure comprises a cryptography boot loader (CBL) a control module on key usage, and one or more application agents. The control module on key usage may be implemented by software and bundled with OS, or hardware bundled with the cryptography component.

The operation in an exemplary embodiment of the present disclosure includes how to load the OS and use the application agents, request the user to provide certificate, obtain RO, and check version.

When the user powers on the apparatus in an exemplary embodiment of the present disclosure, CBL loads the OS and the OS certificate of the user's device, and stores a user key. Then, an RO can be obtained through a corresponding application agent. According to the OS certificate and an application certificate provided by certificate authority (CA), the RO is checked for OS version and application version to determine whether both OS version and application version are valid and are the version requested by the RO. Only when the loaded OS version and application version are both valid and meet the lowest version requirement requested by the RO, the user key can be accessed.

In an exemplary embodiment, the present disclosure may also provide a time protocol so that DRM can perform time control.

In an exemplary embodiment, the present disclosure uses OS certificate or application certificate checking, and version checking with upgrade enforcement to solve the possible problems during exercise rights, for example, the attacking program written by the user, memory dump or profiling for memory access, and other DRM or OS errors.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
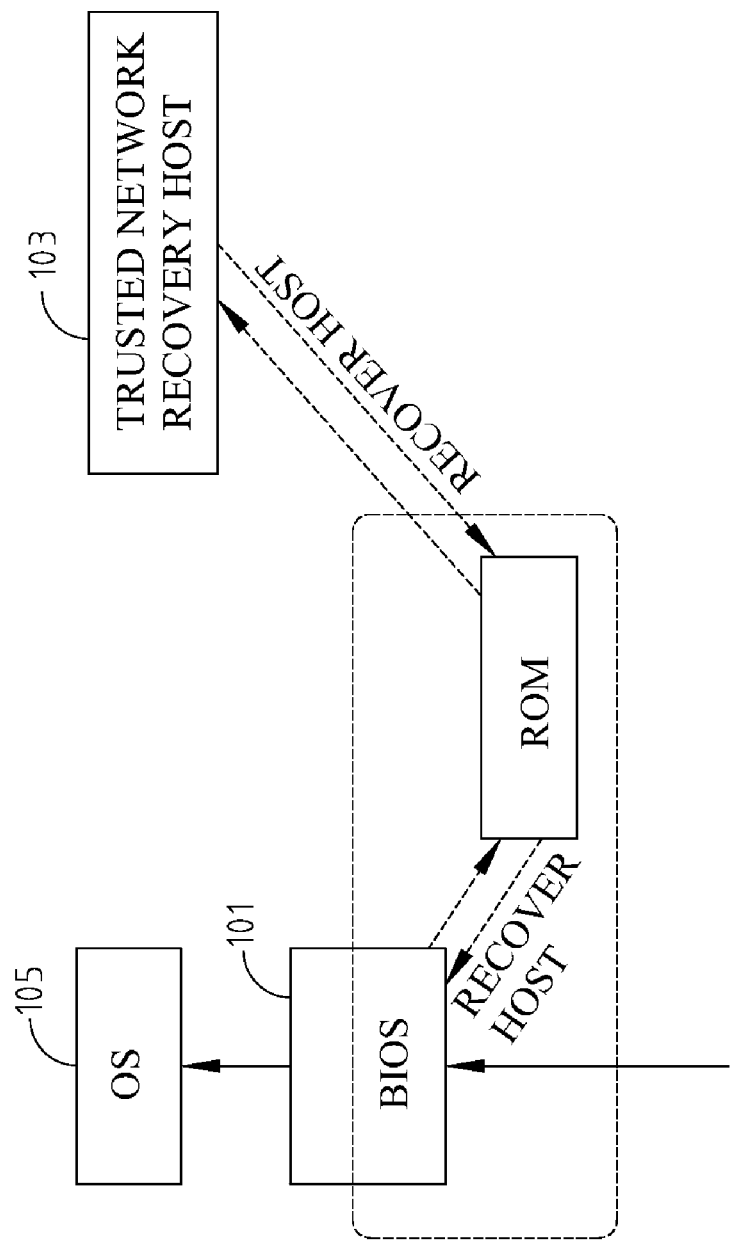
FIG. 1 is a block diagram of an exemplary conventional bootstrapping architecture.
Figure 2:
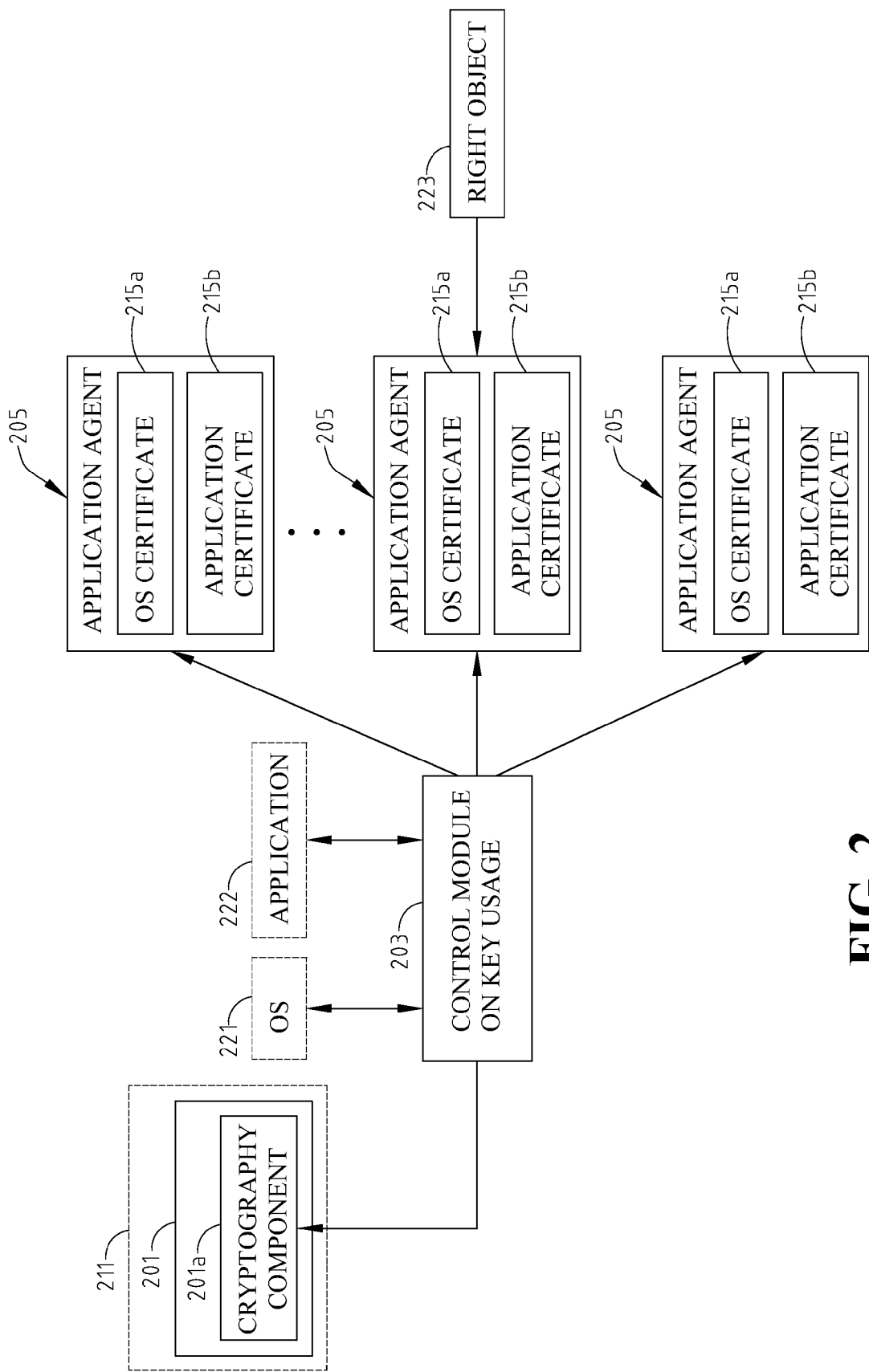
FIG. 2 shows a schematic view of a computerized apparatus for version control and management, consistent with certain disclosed embodiments.

FIG. 2 shows a schematic view of a computerized apparatus for version control and management, consistent with certain disclosed embodiments, where the computerized apparatus is applied to DRM of digital contents. Referring to FIG. 2, a computerize apparatus 200 for version control and management may include a cryptography boot loader (CBL) 201, a control module on key usage 203, and one or more application agents 205. CBL 201 is installed in a user device 211, and has a cryptography component 201a. Each application agent 205 has an OS certificate 215a and a corresponding application certificate 215b provided by OS certificate authority (CA).

Figure 3:
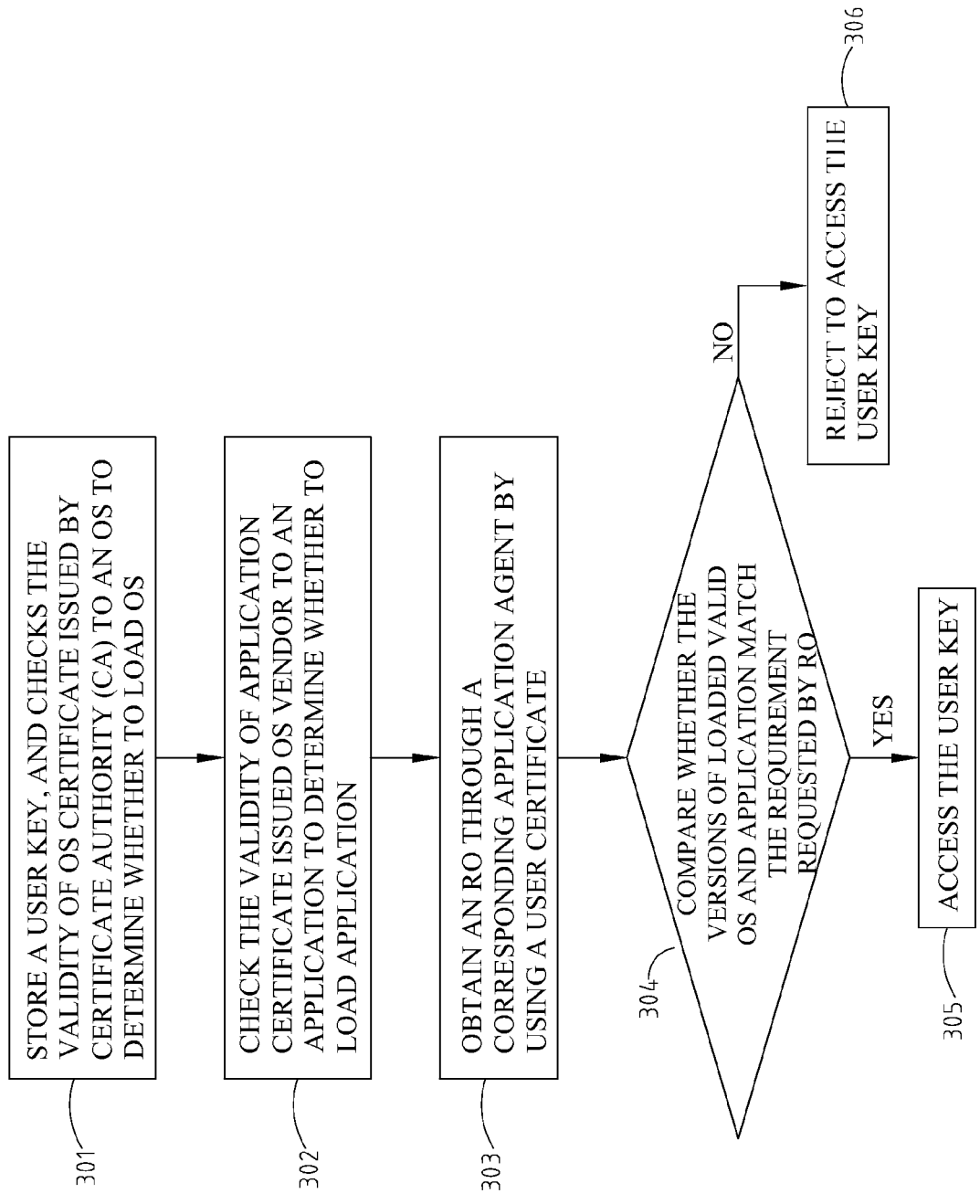
FIG. 3 is a flowchart illustrating an exemplary operation flow of a computerized apparatus, consistent with certain disclosed embodiments.

With the structure of FIG. 2, FIG. 3 illustrates an exemplary operation flow of a computerized apparatus, consistent with certain disclosed embodiments.

When user device 211 is powered on, CBL 201 stores a user key, and checks the validity of OS certificate 215a issued by certificate authority (CA), to an OS 221 to determine whether to load OS 221, as shown in step 301. The user key may be stored in cryptography component 201a. The validity of application certificate 215b issued by OS vendor to an application 222 is checked to determine whether to load application 222, as shown in step 302. Step 303 is to obtain an RO through a corresponding application agent by using a user certificate. Control module on key usage 203 may compare whether the versions of loaded valid OS 221 and application 222 match the requirement requested by RO 223, as shown in step 304. If so, the control module on key usage 203 may access the user key, as shown in step 305; otherwise, the control module on key usage 203 may reject to access the user key, as shown in step 306. There are many ways to reject the user key access, such as CBL 201 shuts down the function of using secret key, or inhibits the booting.

In this manner, it may ensure that the versions of loaded OS and application are both valid, and match the requirement requested by the RO. Therefore, the present invention prevents the unchecked or uncertified OS or application from accessing the user key in the cryptography component, while allows the secured OS and application to access the user key in the cryptography component.

Figure 4A:
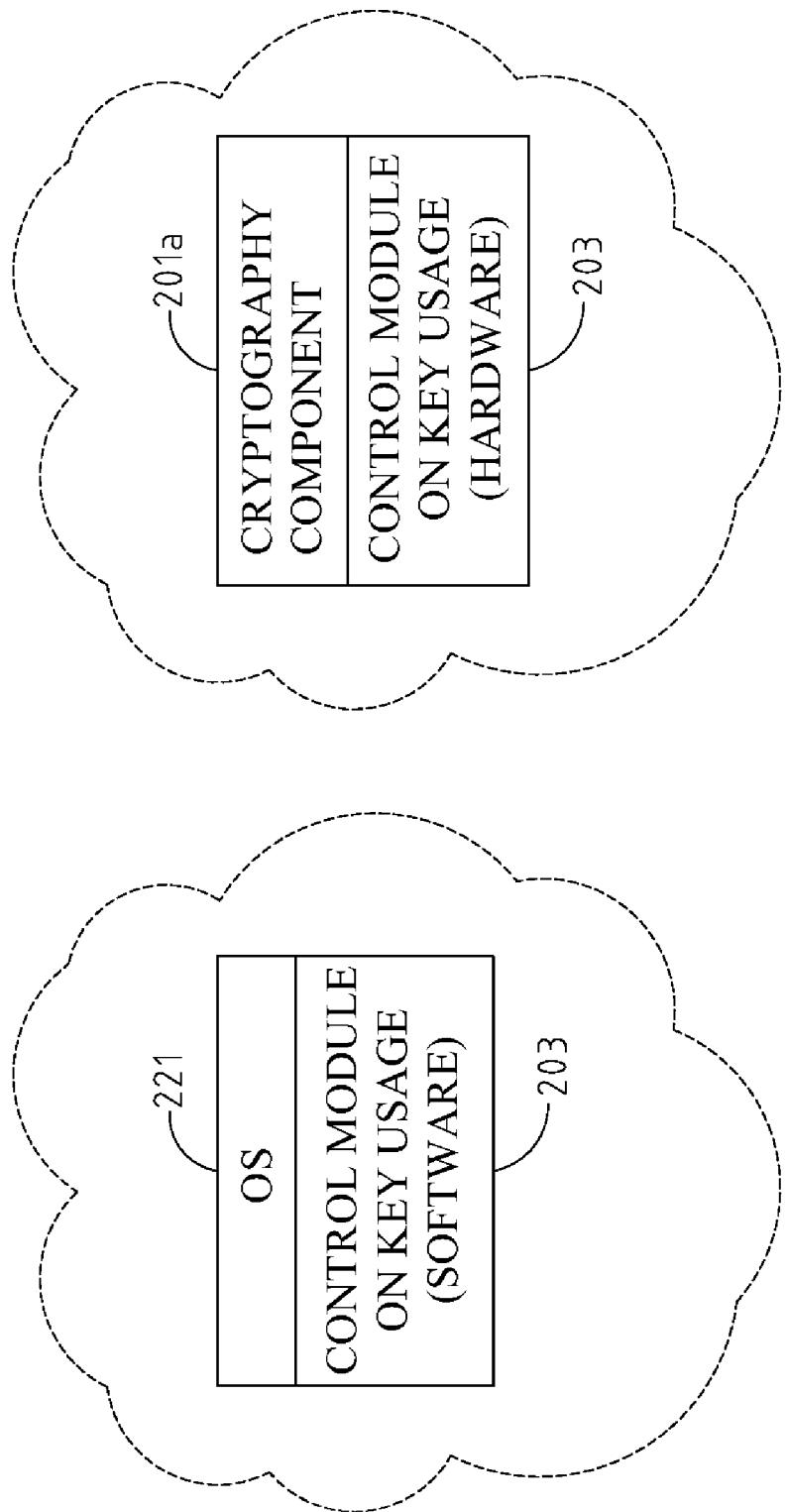
FIG. 4A is a diagram of an exemplary control module on key usage, consistent with certain disclosed embodiments.
Figure 4B:
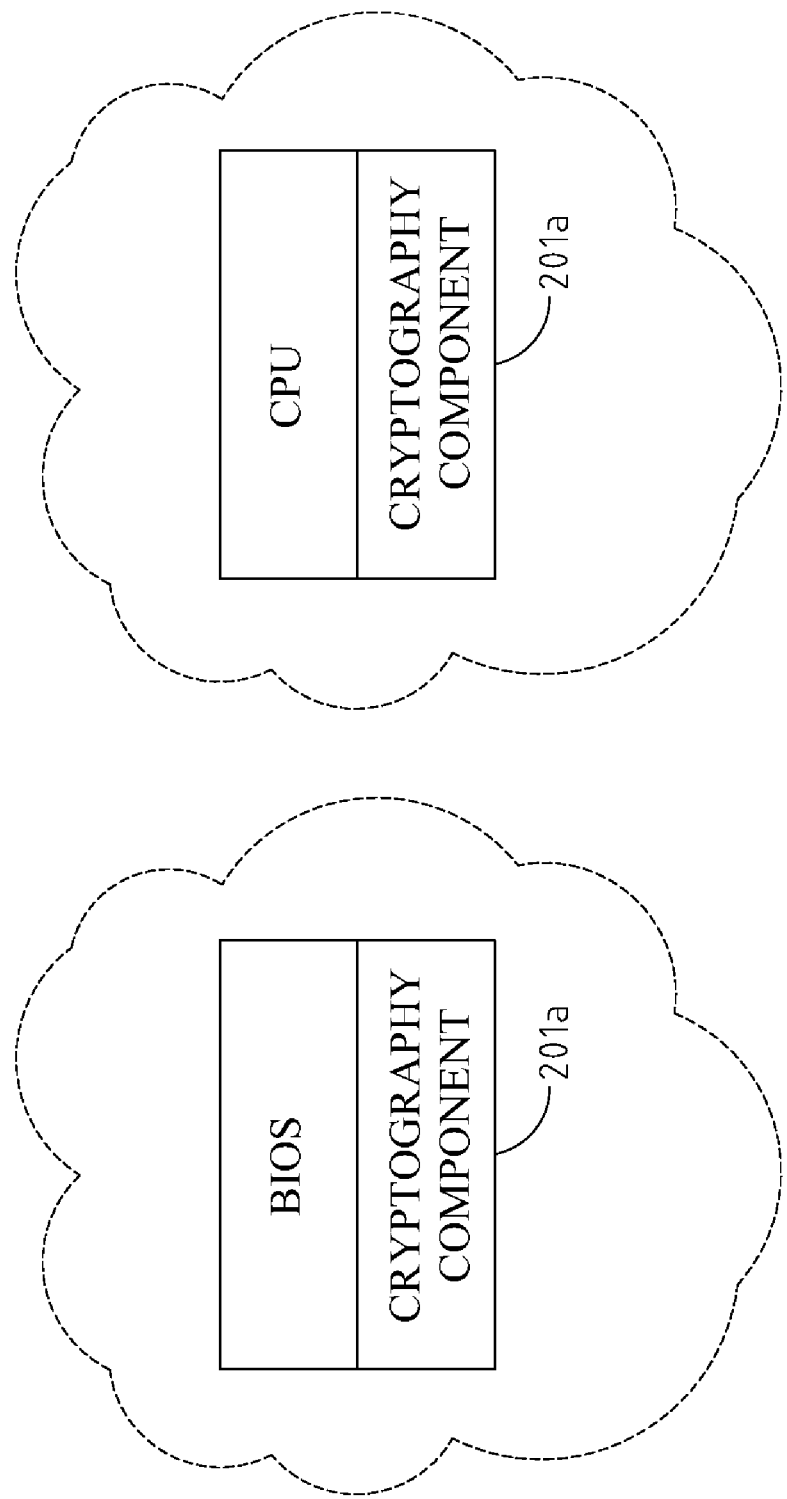
FIG. 4B is a diagram of an exemplary cryptography component, consistent with certain disclosed embodiments.

Control module on key usage 203 may be implemented as software to be bounded together with OS 221 or implemented as hardware to be bounded with cryptography component 201a. Cryptography component 201a may be bounded together with basic input/output system (BIOS), or CPU, as shown in FIGS. 4A & 4B respectively.

From the exemplary flow chart of FIG. 3, it shows that the operation of the present disclosure may include four parts: loading OS and application, requesting the provision of user certificate, obtaining R, and checking versions.

Figure 5:
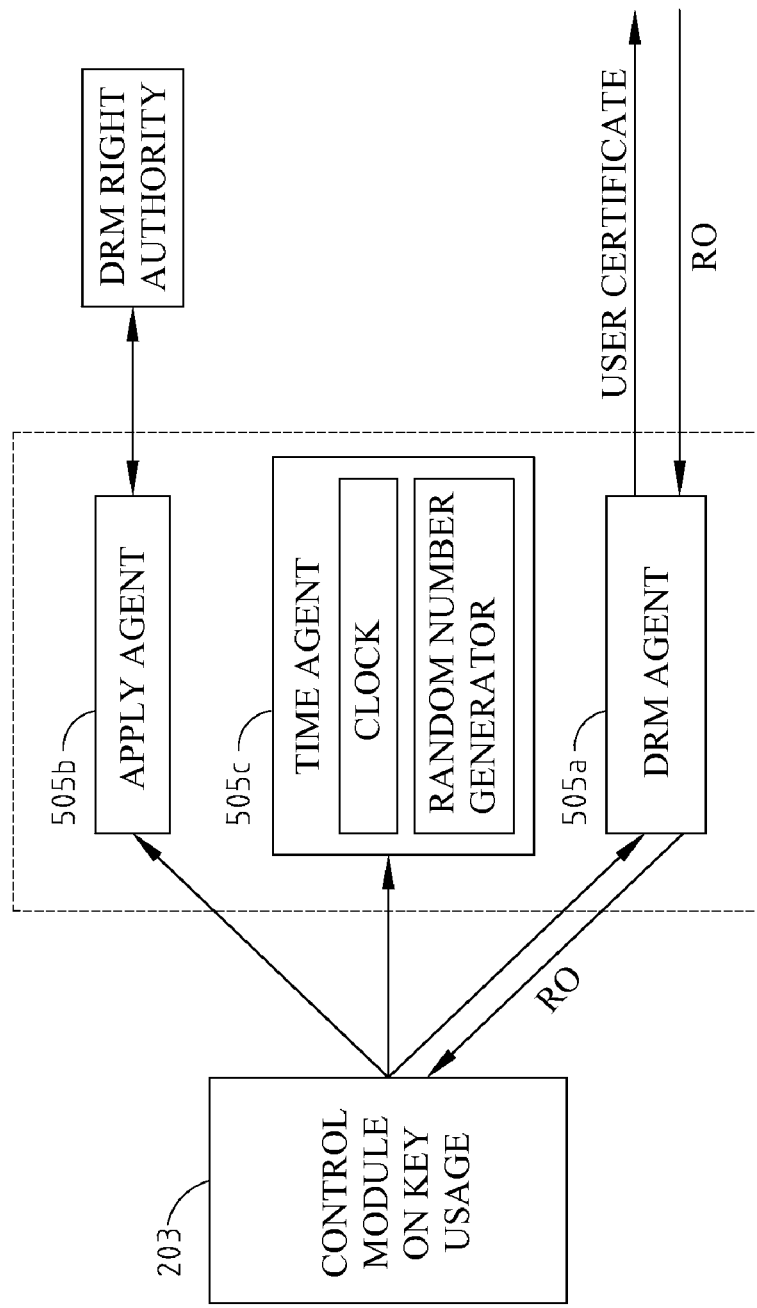
FIG. 5 is a diagram of exemplary application agents, consistent with certain disclosed embodiment.

Referring to FIG. 5, application agents 205a may include a DRM agent 505a, an apply agent 505b, and so on. Control module on key usage 203 may obtain RO through DRM agent 505a, or through apply agent 505 to request DRM rights authority for user certificate. In addition, to allow the time control on the DRM of digital contents, application agents 205 may further include time agent 505c. Time agent 505c may have a clock and a random number generator to execute a time control process to provide a time protocol. The time control process may start after user device 211 is booted.

The following describes how to load OS and application, execute time control process, request the provision of user certificate, obtain RO, and check version.

Figure 6B:
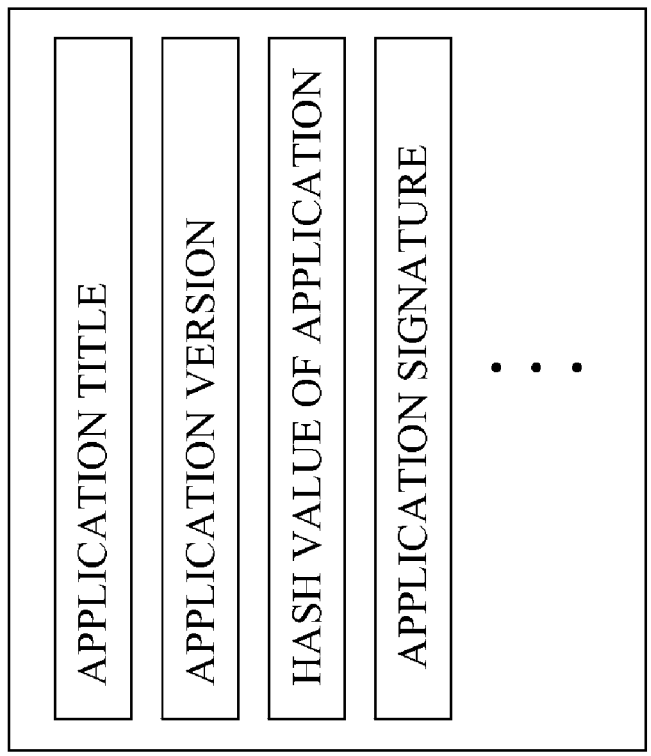
FIG. 6B is a diagram of exemplary contents of the certificate signed by OS vendor, consistent with certain disclosed embodiments.
Figure 6A:
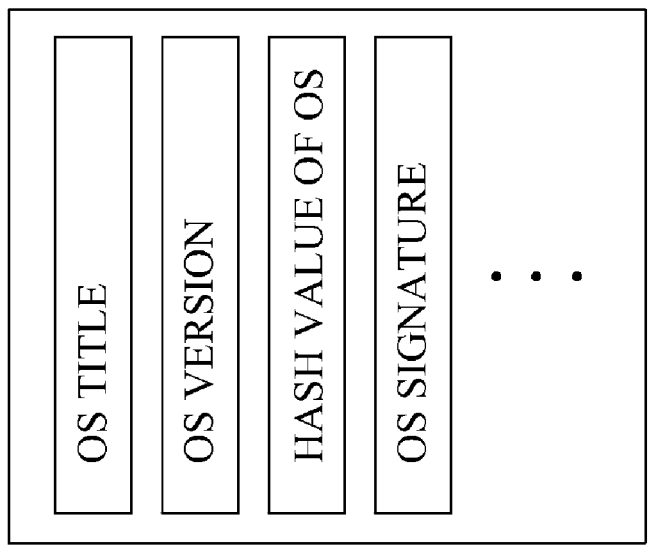
FIG. 6A is a diagram of exemplary contents of the certificate issued by OS certificate authority, consistent with certain disclosed embodiments.

As discussed above, CBL 201 may be installed in user device 211. Therefore, CBL 201 automatically stores the public key provided by OS certificate authority and DRM rights authority. After user device 211 is powered on, the public key provided by OS certificate authority is used to check the validity of certificate 215a. Referring to FIG. 6A, the contents of certificate 215a at least may include an OS title, an OS version, a hash value of OS, and an OS signature. The OS signature is a signature of using the private key of OS certificate authority on the hash value of OS and other related data. For OS version checking, the hash value of OS is compared with the actual OS loaded into user device 211.

Similarly, DRM agent 505a, apply agent 505b and time agent 505c must all have a public key issued by OS certificate authority to the OS vendor and a certificate signed by the OS vendor. Referring to FIG. 6B, the signed certificate must at least include an application title, an application version, a hash value of application, and an application signature. The application signature is a signature of using the private key of application vendor on the hash value of application and other related data. The hash value of application is compared with the actual application loaded into user device 211.

After user device 211 is powered on, CBL 201 loads OS 211a and certificate 215a of user device 211 and with other applications if there is any. The loaded information will be handed to control module on key usage 203 for subsequent OS and application version comparison.

Figure 7:
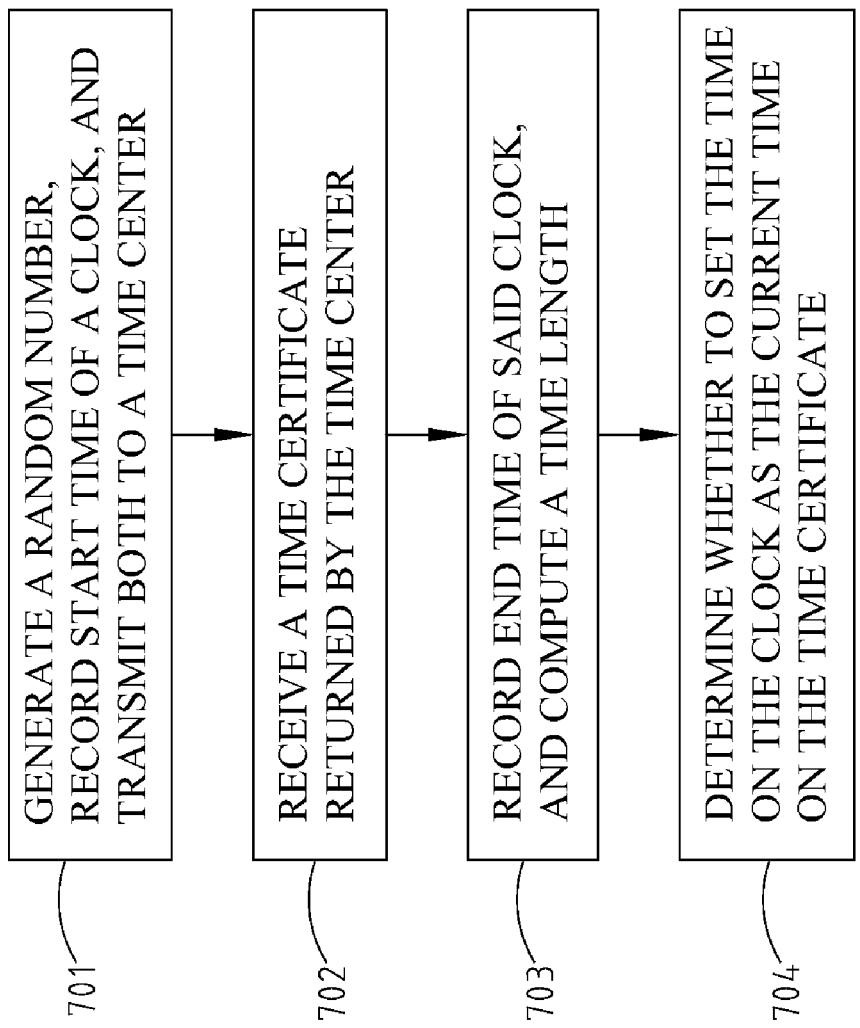
FIG. 7 is a flow chart illustrating an exemplary time control process, consistent with certain disclosed embodiments.

To allow time control for the DRM on digital contents, time agent 505c may also execute a time control process to provide a time protocol. FIG. 7 is a flow chart illustrating an exemplary time control process, consistent with certain disclosed embodiments. Referring to FIG. 7, step 701 is to generate a random number Z1, record a starting time start_time of a clock, and transmit both to a time authority. Step 702 is to receive a time certificate returned by the time authority. The time certificate at least may include a random number Z2, a current time T, and the signature signed by the time authority. Step 703 is to record the ending time end_time of the clock and compute the time length L, that is L=end_time−start_time. Finally, step 704 is to determine whether the clock is set to the current time T of the time certificate.

In step 704, only when L is less than a pre-determined threshold, such as 1 minute, and random number Z1 and random number Z2 match, the clock will be set as the current time T on time certificate.

Whether the time process should execute may be implemented as follows. CBL 201 includes a flag, referred to as Flag_TrustedTime. After system's booting, if Flag_TrustedTime of CBL is false, time agent 505c is activated when the system is first connected to Internet and executes time control process.

As discussed above, control module on key usage 203 may obtain RO through DRM, or request to DRM right authority for user certificate through apply agent 505b. Referring to FIG. 7, the user may use apply agent 505b to generate a pair of keys. The key pair may include a user public key and a user private key. The user public key is used for requesting the DRM right authority for user certificate.

With the user certificate, the user may obtain a corresponding RO from a right issuer through the DRM agent. The RO may include the key information for encrypting the content object (CO), user related information and the minimum version requirement requested by right issuer on OS version and application version. The user may decrypt with the corresponding private key.

Only when the version of OS and application on user device 211 meet the minimum version requirements in the RO, control module on key usage 203 may access the user key.

If the OS version or the application version is invalid or lower than the version requirement, the user key may not be accessed. One way to enforce the user to upgrade the OS or application version is to disable the user from using the new RO.

Because OS or application may have errors, to upgrade and patch the errors, cryptography component 201a may be bounded together with BIOS, and control module on key usage 203 may be bounded together with OS, as shown in FIG. 7. At the core of the OS or BIOS, there exists an error-free zone. This zone is important to the DRM. Control module on key usage 203 may use this zone to check version by using a simple program. In other words, the version checking on OS and application is executed in the zone in the core of OS. The checking program may also be limited to a certain length, such as within a few hundred lines of codes, to ensure the low probability of errors in control module on key usage 203.

Control module on key usage 203 may use this zone for version checking to ensure that the user upgrades the OS and application to meet the version requirement by the RO in order to use the new RO and the CO.

Therefore, the present disclosure may solve the problem encountered during exercising rights. For example, when the user rewrites attacking program, the present disclosure checks the OS and application certificates. When memory is profiled or dumped and an error occurs in OS, the present disclosure may use version checking to enforce the version upgrade. When other application accesses CO and an error occurs in OS, the present disclosure may use version checking to enforce version upgrade. Or, when DRM application, other applications, or OS encounter errors, the present disclosure may use version checking to enforce version upgrade.

In summary, the present disclosure may provide a method for DRM in a secured OS and application environment. By integrating cryptography component and boot loader, the present disclosure ensures that only secured OS and secured application may access the secret key in the cryptography component. To prevent errors from occurring in OS or application, the control module on key usage of the present disclosure uses a special program zone to check versions, discover errors and enforce version upgrade. In addition, a time protocol may be provided to the DRM for time control in the present disclosure.

Although the present disclosure has been described with reference to the preferred embodiments, it will be understood that this invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A computerized apparatus for version control and management, comprising:

at least one application agent having an operating system certificate issued by an operating system certificate authority, for obtaining a right object of a corresponding application;

a cryptography and boot loader, installed in a user device, and having a cryptography component, said cryptography and boot loader loading an operating system of said user device and an application, and storing a user key in said cryptography component; and a control module on key usage, for checking whether versions of the loaded operating system and application meet a version requirement requested by said right object to determine if said user key should be accessed.

2. The apparatus as claimed in claim 1, wherein each of said at least one application agent is a digital content management agent.

3. The apparatus as claimed in claim 1, wherein said at least one application agent further comprises:

a digital right management (DRM) agent, for accessing said right object; and an apply agent, for requesting a user certificate to a DRM right authority.

4. The apparatus as claimed in claim 3, wherein said at least one application agent further includes a time agent for providing a time protocol.

5. The apparatus as claimed in claim 4, wherein said time agent has a clock and a random number generator.

6. The apparatus as claimed in claim 1, wherein said control module on key usage is software bounded together with said operating system.

7. The apparatus as claimed in claim 1, wherein said control module on key usage is hardware bounded together with said cryptography component.

8. The apparatus as claimed in claim 1, wherein said cryptography and boot loader has a time flag for determining whether to execute time confirmation.

9. A computerized method for version control and management, applicable to digital right management of digital contents, said method comprising the steps of:
   storing a user key and checking the validity of an operating system certificate of an operating system issued by an operating system certificate authority to determine whether to load said operating system;
   checking the validity of an application certificate of an application to determine whether to load said application;
   obtaining a right object through a corresponding application agent by using a user certificate;
   checking whether versions of a loaded operating system and a loaded application meet a version requirement requested by said right object; and
   determining whether to allow access to said user key.

10. The method as claimed in claim 9, wherein said version requirement requested by said right object is minimum versions required by a right issuer.

11. The method as claimed in claim 9, wherein checking whether versions of a loaded operating system and a loaded application meet a version requirement requested by said right object is executed in a zone of a core of said operating system.

12. The method as claimed in claim 9, wherein checking whether versions of a loaded operating system and a loaded application meet a version requirement requested by said right object is executed in a zone of a core of a basic input output system.

13. The method as claimed in claim 9, wherein said method further includes a time control process.

14. The method as claimed in claim 13, wherein said time control process further includes the following steps of:
   generating a first random number, recording a starting time of a clock, and transmitting said first random number and said starting time to a time center;
   receiving a time certificate returned by said time center, said time certificate at least comprising a second random number, a current time, and a signature signed by said time center;
   recording an ending time of said clock, and computing a time length; and
   determining whether to set the time on said clock as said current time on said time certificate.

15. The method as claimed in claim 9, a user is not allowed to use a new right object and a content object corresponding to said new right object if said operating system certificate or said application certificate is invalid.

16. The method as claimed in claim 9, a user is not allowed to use a new right object and a content object corresponding to said new right object if the versions of said loaded operating system and said loaded application do not meet said version requirement.

17. The method as claimed in claim 9, wherein said application certificate is signed by an operating system vendor.

18. The method as claimed in claim 13, wherein time control process is executed after a user device is booted.

* * * * *